United States Patent
Birkett et al.

(10) Patent No.: US 7,951,884 B1
(45) Date of Patent: May 31, 2011

(54) CURE ACCELERATORS FOR ANAEROBIC ADHESIVE COMPOSITIONS

(75) Inventors: David P. Birkett, Kildare (IE); Martin Wyer, Meath (IE)

(73) Assignee: Loctite (R&D) Limited, Dublin (IE)

( * ) Notice: Subject to any disclaimer, the term of this patent is extended or adjusted under 35 U.S.C. 154(b) by 262 days.

(21) Appl. No.: 12/415,460

(22) Filed: Mar. 31, 2009

(51) Int. Cl.
C09J 4/02 (2006.01)
C08F 20/06 (2006.01)
C08F 20/10 (2006.01)

(52) U.S. Cl. ..................... 526/217; 526/307.7

(58) Field of Classification Search ........... 526/217, 526/307.7
See application file for complete search history.

(56) References Cited

U.S. PATENT DOCUMENTS

| 3,218,305 | A | 11/1965 | Krieble |
| 3,970,505 | A | 7/1976 | Hauser et al. |
| 4,070,334 | A * | 1/1978 | Green ................... 523/176 |
| 4,180,640 | A | 12/1979 | Melody et al. |
| 4,287,330 | A | 9/1981 | Rich |
| 4,321,349 | A | 3/1982 | Rich |
| 5,411,988 | A | 5/1995 | Bockow et al. |
| 5,503,936 | A | 4/1996 | Blyakhman |
| 5,605,999 | A | 2/1997 | Chu et al. |
| 6,583,289 | B1 * | 6/2003 | McArdle et al. ........... 548/123 |
| 6,723,763 | B2 | 4/2004 | Zhu et al. |
| 7,411,025 | B1 * | 8/2008 | Messana et al. ........... 526/215 |

FOREIGN PATENT DOCUMENTS

| DE | 1817989 | 12/1976 |
| DE | 2806701 | 8/1978 |
| JP | 07-308757 | 11/1995 |
| WO | WO 99/01484 | 1/1999 |
| WO | WO 00/40664 | 7/2000 |

OTHER PUBLICATIONS

R.D. Rich, "Anaerobic Adhesives" in Handbook of Adhesive Technology, 29, 467-79, A. Pizzi and K.L. Mittal, eds., Marcel Dekker, Inc., New York (1994).

* cited by examiner

Primary Examiner — Satya B Sastri
(74) Attorney, Agent, or Firm — Steven C. Bauman

(57) ABSTRACT

The present invention relates to anaerobic cure systems containing enamines, their use as cure accelerators for anaerobic adhesive compositions, and anaerobic adhesive compositions including such enamine cure accelerators.

14 Claims, 2 Drawing Sheets

US 7,951,884 B1

CURE ACCELERATORS FOR ANAEROBIC ADHESIVE COMPOSITIONS

BACKGROUND

1. Field

The present invention relates to anaerobic cure systems containing enamines, their use as cure accelerators for anaerobic adhesive compositions, and anaerobic adhesive compositions including such enamine cure accelerators.

2. Brief Description of Related Technology

Anaerobic adhesive compositions generally are well-known. See e.g. R. D. Rich, "Anaerobic Adhesives" in *Handbook of Adhesive Technology*, 29, 467-79, A. Pizzi and K. L. Mittal, eds., Marcel Dekker, Inc., New York (1994), and references cited therein. Their uses are legion and new applications continue to be developed.

Conventional anaerobic adhesives ordinarily include a free-radically polymerizable acrylate ester monomer, together with a peroxy initiator and an inhibitor component. Oftentimes, such anaerobic adhesive compositions also contain accelerator components to increase the speed with which the composition cures.

Desirable anaerobic cure-inducing compositions to induce and accelerate cure may include saccharin, toluidines, such as N,N-diethyl-p-toluidine and N,N-dimethyl-o-toluidine, acetyl phenylhydrazine ("APH"), maleic acid, and quinones, such as napthaquinone and anthraquinone. See e.g. U.S. Pat. Nos. 3,218,305 (Krieble), 4,180,640 (Melody), 4,287,330 (Rich) and 4,321,349 (Rich).

In addition, other curatives for anaerobic adhesives include thiocaprolactam (e.g., U.S. Pat. No. 5,411,988) and thioureas [e.g., U.S. Pat. No. 3,970,505 (Hauser) (tetra methyl thiourea), German Patent Document Nos. DE 1 817 989 (alkyl thioureas and N,N'-dicyclohexyl thiourea) and 2 806 701 (ethylene thiourea), and Japanese Patent Document No. JP 07-308,757 (acyl, alkyl, alkylidene, alkylene and alkyl thioureas)], certain of the latter of which had been used commercially up until about twenty years ago.

Loctite (R&D) Ltd. owns a new class of materials—trithiadiaza pentalenes—effective as curatives for anaerobic adhesive compositions. The addition of these materials into anaerobic adhesives as a replacement for conventional curatives (such as APH) surprisingly provides at least comparable cure speeds and physical properties for the reaction products formed therefrom. (See International Patent Publication No. WO 00/40664.)

In an unrelated field of technology, U.S. Pat. No. 5,503,936 (Blyakhman) describes and claims curable modified epoxy resin compositions having an epoxy resin, a hardener or curing agent and 2.5 to 12.5% by weight of a compound represented by

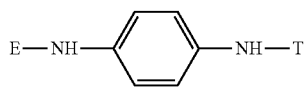

where E and T are $C_{5-12}$ alkyl, $C_{5-8}$ cycloalkyl, $C_{7-15}$ phenylalkyl, or $C_{6-10}$ aryl, with or without substitution by one or two $C_{1-4}$ groups. The hardeners or curing agents of the '936 patent are described as aliphatic, aromatic or cycloaliphatic di- or polyamines, such as diethylenetriamine, N-aminoethylpiperazine, 4,4'-diaminodicyclohexylmethane, 4,4'-diaminodiphenyl sulfone, diethyldiaminotoluene, dicyandiamide, or guanidine; polycarboxylic acid anhydrides, such as phthalic anhydride or trimellitic anhydride; catalytic curing agents such as tertiary amines, imidazoles or complexes of boron trifluoride; difunctional and multifunctional phenols; or phenol or cresol novolac resins.

In addition, a number of suppliers including Flexsys America, Akron, Ohio, Sumitomo Chemical, Osaka, Japan, and Crompton Corporation, Waterbury, Conn. sell phenylene diamine type anti-oxidants, which are promoted to retard oxidation, degradation, or pre-mature polymerization.

Henkel Corporation recently developed an anaerobic anaerobic adhesive composition, comprising:

(a) a (meth)acrylate component;
(b) an anaerobic cure-inducing composition; and
(c) the following phenylene diamine-based cure accelerator:

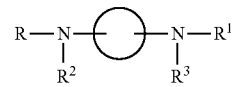

where R and $R^1$ may be the same or different and may be selected from $C_{1-12}$ alkyl, $C_{1-12}$ alkenyl, $C_{5-12}$ cyclo or bicycloalkyl, $C_{6-18}$ aryl, and derivatives thereof, and is $C_{6-18}$ arylene, and derivatives thereof and oxidized versions thereof. [See U.S. Pat. No. 6,723,763 (Zhu).]

There is an on-going desire to find alternative technologies to differentiate existing products and provide supply assurances in the event of shortages or cessation of supply of raw materials. Accordingly, it would be desirable to identify new materials which function as accelerators in the cure of anaerobic adhesives.

SUMMARY

The present invention provides a new class of materials—enamines—, which surprisingly are effective as cure accelerators for anaerobic adhesive compositions.

Thus, the present invention provides in one aspect of an anaerobic cure system comprising a compound having at least one enamine unit. The enamine unit may be formed from a carbocyclic ring having at least 5 ring atoms.

In another aspect, the invention provides an anaerobic adhesive composition, comprising: (a) a (meth)acrylate component; and (b) an anaerobic cure system comprising a compound having at least one enamine unit.

The enamines may be defined as those within the following structure I:

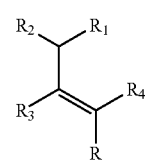

where R, $R^1$ and $R^2$ are each independently selected from alkyl, alkenyl, cycloalkenyl or aryl and substituted versions thereof, or taken together form a saturated or unsaturated ring with or without interuption by a heteroatom and with or without substitution;

$R^3$ and $R^4$ are each independently selected from —C(=X)—$R^5$ or Ar, where $R^5$ is alkyl, cycloalkyl, alkenyl, cycloalkenyl and aryl and substituted versions thereof, and Ar is an aromatic ring; and X is O, S, NR⁶, CR⁷R⁸, or CR⁷NR¹R², where R⁶, R⁷ or R⁸ are each independently selected from alkyl, alkenyl, cycloalkenyl or aryl and substituted versions thereof, and R¹ and R² are each independently as defined above.

This invention also provides methods of preparing and using the inventive anaerobic adhesives as well as reaction products of the inventive anaerobic adhesives.

The addition of these materials into anaerobic adhesives as a replacement for some or all of the amount of conventional anaerobic cure accelerators (such as the toluidines noted above) surprisingly provides at least comparable cure speeds and physical properties for the reaction products formed therefrom.

The present invention will be more fully appreciated by a reading of the "Detailed Description", and the illustrative examples which follow thereafter.

DETAILED DESCRIPTION

Figure 1:
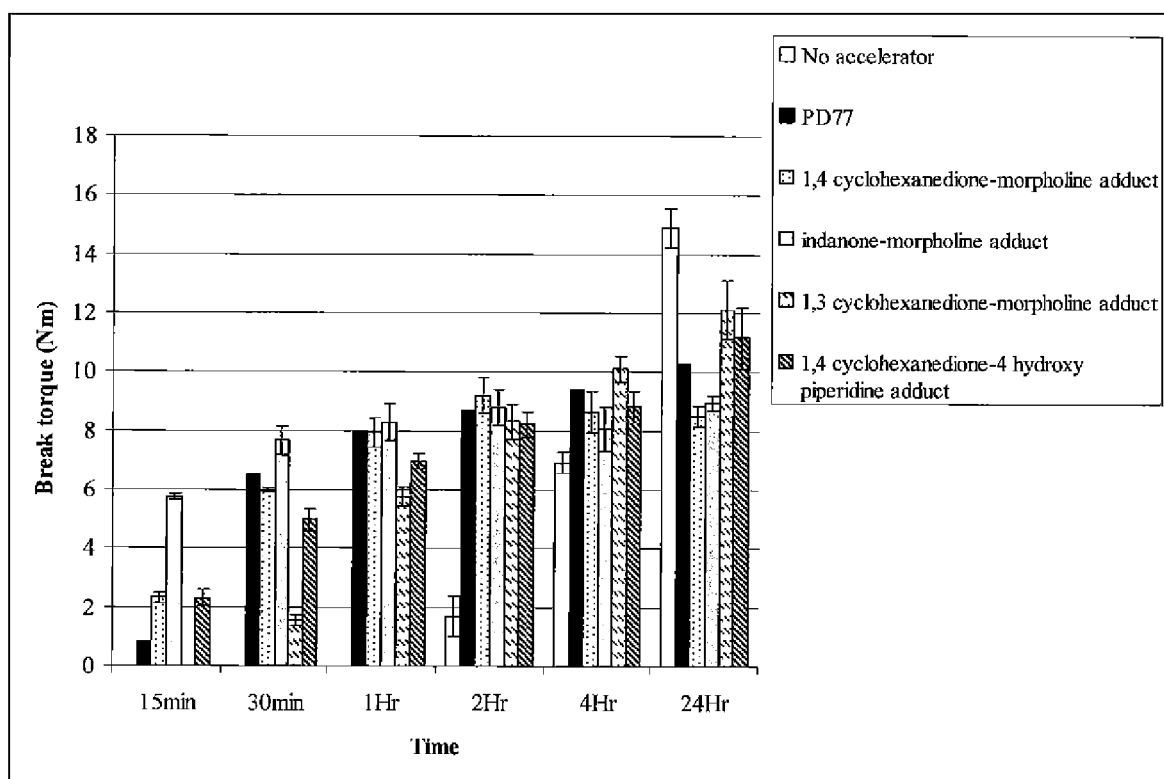
FIG. 1 depicts break torque against cure time for inventive anaerobic adhesive compositions and control anaerobic adhesive compositions.

As noted above, the present invention provides an anaerobic adhesive composition, comprising: (a) a (meth)acrylate component; and (b) an anaerobic cure system comprising a compound having at least one enamine unit.

The addition of such compounds as cure accelerators into anaerobic adhesives as a replacement for some or all of the amount of conventional cure accelerators surprisingly provides at least comparable cure speeds and physical properties for the reaction products formed.

This invention also provides an anaerobic cure system comprising a compound having at least one enamine unit and optionally with one or more members selected from saccharin, peroxides, chelators, metals, hydrazines [such as acetyl phenyl hydrazine ("APH")] or toluidines [such as dimethyl-o-toluidine ("DM-o-T") or diethyl-p-toluidine ("DE-p-T")].

The enamine cure accelerators may be represented by the following structure I:

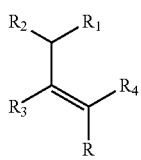

where R, R¹ and R² are each independently selected from alkyl, cycloalkyl, alkenyl, cycloalkenyl or aryl and substituted versions thereof, or taken together form a saturated or unsaturated ring with or without interuption by a heteroatom and with or without substitution;

at least one of R³ and R⁴ (is)are each independently selected from —C(═X)—R⁵ or Ar, wherein R⁵ is alkyl, cycloalkyl, alkenyl, cycloalkenyl and aryl and substituted versions thereof, and Ar is an aromatic ring; and X is O, S, NR⁶, CR⁷R⁸, or CR⁷NR¹R², where R⁶, R⁷ or R⁸ are each independently selected from alkyl, cycloalkyl, alkenyl, cycloalkenyl or aryl and substituted versions thereof, and R¹ and R² are each independently as defined above. Where only one of R³ or R⁴ is selected from —C(═X)—R⁵ or Ar, the other of R³ or R⁴ may be H, alkyl, cycloalkyl, alkenyl, or cycloalkenyl. Moreover, R⁵, R⁶, R⁷ and R⁸ may form between two of them a saturated or unsaturated ring with or without interuption by a heteroatom and with or without substitution.

The enamine compounds may be formed from a carbocyclic ring having at least 5 ring atoms, desirably 6 ring atoms.

The following emanine compounds are thus embraced by the invention:

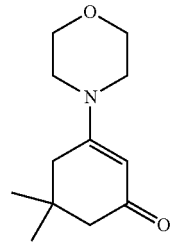

A

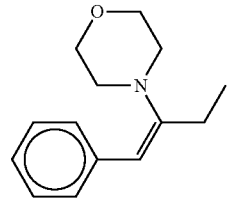

B

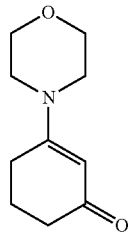

C 1, 3 cyclohexanedione-
morpholine adduct

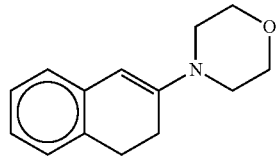

D

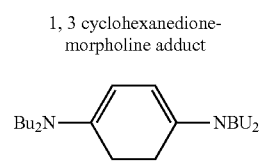

E

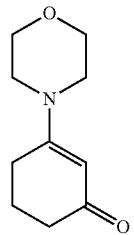

F 1, 4 cyclohexanedione 4 hydroxy
piperidine-adduct

G

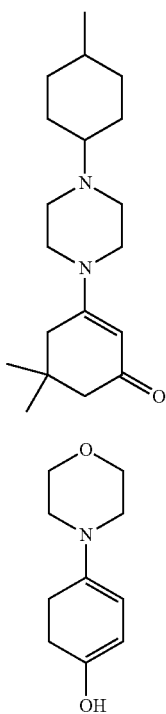

1, 4 cyclohexanedione-morpholine adduct

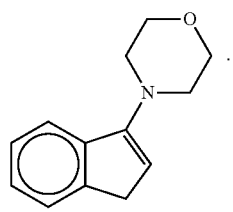

Indanone-mopholine adduct (Meth)acrylate monomers suitable for use as the (meth) acrylate component in the present invention may be chosen from a wide variety of materials, such as these represented by $H_2C=CGCO_2R^1$, where G may be hydrogen, halogen or alkyl groups having from 1 to about 4 carbon atoms, and $R^1$ may be selected from alkyl, cycloalkyl, alkenyl, cycloalkenyl, alkaryl, aralkyl or aryl groups having from 1 to about 16 carbon atoms, any of which may be optionally substituted or interrupted as the case may be with silane, silicon, oxygen, halogen, carbonyl, hydroxyl, ester, carboxylic acid, urea, urethane, carbonate, amine, amide, sulfur, sulfonate, sulfone and the like.

Additional (meth)acrylate monomers suitable for use herein include polyfunctional (meth)acrylate monomers, such as di- or tri-functional (meth)acrylates like polyethylene glycol di(meth)acrylates, tetrahydrofuran (meth)acrylates and di(meth)acrylates, hydroxypropyl (meth)acrylate ("HPMA"), hexanediol di(meth)acrylate, trimethylol propane tri(meth)acrylate, diethylene glycol dimethacrylate, triethylene glycol dimethacrylate, tetraethylene glycol dimethacrylate, dipropylene glycol dimethacrylate, di-(pentamethylene glycol) dimethacrylate, tetraethylene diglycol diacrylate, diglycerol tetramethacrylate, tetramethylene dimethacrylate, ethylene dimethacrylate, neopentyl glycol diacrylate, trimethylol propane triacrylate and bisphenol-A di(meth)acrylates, such as ethoxylated bisphenol-A (meth) acrylate ("EBIPMA").

Other (meth)acrylate monomers may also be used, such as reaction products of the diglycidylether of bisphenol-A with methacrylic acid and a (meth)acrylate ester corresponding to structure as shown below:

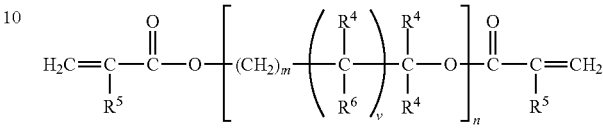

where $R^4$ may be selected from hydrogen, alkyl groups having from 1 to about 4 carbon atoms, hydroxyalkyl groups having from 1 to about 4 carbon atoms or

H

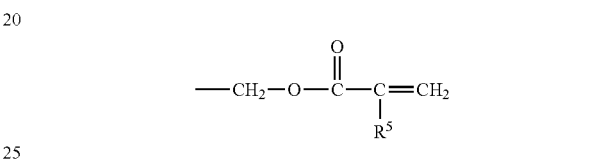

$R^5$ may be selected from hydrogen, halogen, and alkyl groups of from 1 to about 4 carbon atoms;

$R^6$ may be selected from hydrogen, hydroxy and

I

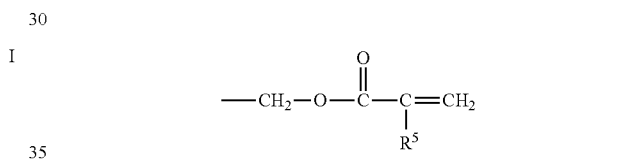

m is an integer equal to at least 1, e.g., from 1 to about 8 or higher, for instance, from 1 to about 4;

v is 0 or 1; and n is an integer equal to at least 1, e.g., 1 to about 20 or more.

Still other (meth)acrylate monomers that may be used herein include silicone (meth)acrylate moieties ("SiMA"), such as those taught by and claimed in U.S. Pat. No. 5,605, 999 (Chu), the disclosure of which is hereby expressly incorporated herein by reference.

Of course, combinations of these (meth)acrylate monomers may also be used.

The (meth)acrylate component should comprise from about 10 to about 90 percent by weight of the composition, such as about 60 to about 90 percent by weight, based on the total weight of the composition.

The enamine compounds as so described herein should be used in an amount within the range of about 0.01 to about 20 percent by weight, such as about 0.1 to about 10 percent by weight, desirably about 0.5 to about 5 percent by weight, based on the total weight of the composition. When used in combination with conventional accelerators (though at lower levels, for such conventional accelerators), the enamine compounds as so described herein should be used in amounts of 0.01 to 5 percent, such as 0.02 to 1 percent, desirably about 0.05 to about 0.5 percent by weight, based on the total weight of the composition.

Recently, additional components have been included in traditional anaerobic adhesives to alter the physical properties of either the formulation or the reaction products thereof.

For instance, one or more of maleimide components, thermal resistance-conferring coreactants, diluent components reactive at elevated temperature conditions, mono- or polyhydroxyalkanes, and plasticizers, such as polymderic ones (see International Patent Application No. PCT/US98/13704, the disclosure of which is hereby expressly incorporated herein by reference) may be included to modify the physical property and/or cure profile of the formulation and/or the strength or temperature resistance of the cured adhesive.

When used, the maleimide, coreactant reactive diluent, polymeric plasticizer, and/or mono- or poly-hydroxyalkanes, may be present in an amount within the range of about 1 percent to about 30 percent by weight, based on the total weight of the composition.

The inventive compositions may also include other conventional components found in anaerobic cure systems, such as free radical initiators, free radical accelerators and co-accelerators, inhibitors of free radical generation, as well as chelators and metal catalysts.

A number of well-known initiators of free radical polymerization are typically incorporated into the inventive compositions including, without limitation, hydroperoxides, such as cumene hydroperoxide ("CHP"), para-menthane hydroperoxide, t-butyl hydroperoxide ("TBH") and t-butyl perbenzoate. Other peroxides include benzoyl peroxide, dibenzoyl peroxide, 1,3-bis(t-butylperoxyisopropyl)benzene, diacetyl peroxide, butyl 4,4-bis(t-butylperoxy)valerate, p-chlorobenzoyl peroxide, cumene hydroperoxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butyl-peroxyhex-3-yne, 4-methyl-2,2-di-t-butylperoxypentane and combinations thereof.

Such peroxide compounds are typically employed in the present invention in the range of from about 0.1 to about 10 percent by weight, based on the total weight of the composition, with about 1 to about 5 percent by weight being desirable.

Conventional accelerators of free radical polymerization may also be used in conjunction with the enamine accelerators, though in amounts less than that used in the past. Such cure accelerators are typically of the hydrazine variety (e.g., APH), as disclosed in the '330 and '349 patents. One benefit of the present invention is that the phenylene diamine cure accelerators render the use of such accelerators optional in preparing anaerobic adhesive compositions.

Co-accelerators of free radical polymerization may also be used in the compositions of the present invention including, without limitation, organic amides and imides, such as benzoic sulfimide (also known as saccharin). [See U.S. Pat. Nos. 4,287,350 (Rich) and 4,321,349 (Rich).]

Stabilizers and inhibitors (such as phenols including hydroquinone and quinones) may also be employed to control and prevent premature peroxide decomposition and polymerization of the composition of the present invention, as well as chelating agents [such as the tetrasodium salt of ethylenediamine tetraacetic acid ("EDTA")] to trap trace amounts of metal contaminants therefrom.

When used, chelators may ordinarily be present in the compositions in an amount from about 0.001 percent by weight to about 0.06 percent by weight, based on the total weight of the composition.

Metal catalyst solutions or pre-mixes thereof are used in amounts of about 0.03 to about 0.1 percent by weight.

Thickeners and/or fillers may also be incorporated therein where the art-skilled believes it would be desirable to do so.

The present invention also provides methods of preparing and using the inventive anaerobic adhesive compositions, as well as reaction products of the compositions.

The compositions of the present invention may be prepared using conventional methods which are well known to those persons of skill in the art. For instance, the components of the inventive compositions may be mixed together in any convenient order consistent with the roles and functions the components are to perform in the compositions. Conventional mixing techniques using known apparatus may be employed.

The compositions of this invention may be applied to a variety of substrates to perform with the desired benefits and advantages described herein. For instance, appropriate substrates may be constructed from steel, brass, copper, aluminum, zinc, and other metals and alloys, ceramics and thermosets. The compositions of this invention demonstrate particularly good bond strength on steel, brass, copper and zinc. In addition, the compositions are particularly attractive as regards cure through volume, which ordinarily eludes conventional anaerobic adhesives.

As with other anaerobic adhesives, the compositions of the present invention are capable of curing in the substantial absence of air. However, unlike some anaerobic adhesive compositions, the compositions of this invention are capable of curing to form a reaction product at ambient environmental conditions, i.e., at room temperature, instead of requiring elevated temperatures. And while the so-formed reaction product forms an acceptable bond, that bond is capable of withstanding elevated temperature conditions by resisting thermal degradation.

In addition, this invention provides a method of preparing an anaerobic adhesive, the steps of which include mixing together a (meth)acrylate component and as an anaerobic cure accelerator enamine compounds as so described herein.

The invention also provides a process for preparing a reaction product from the anaerobic adhesive composition of the present invention, the steps of which include applying the composition to a desired substrate surface and exposing the composition to an anaerobic environment for a time sufficient to cure the composition.

This invention also provides a method of using as a cure accelerator for anaerobic adhesives enamine compounds as so described herein.

And the present invention provides a method of using an anaerobic curative enamine compounds as so described herein as a replacement for acetyl phenylhydrzine and/or toluidine(s) as cure accelerators for anaerobic adhesives.

In view of the above description of the present invention, it is clear that a wide range of practical opportunities is provided. The following examples are provided for illustrative purposes only, and are not to be construed so as to limit in any way the teaching herein.

EXAMPLES

Formulation of Anaerobic Adhesives

Six compositions were prepared from the listed components in the noted amounts as set forth below in Table 1 in percent by weight:

TABLE 1

| Components | | Sample Nos./Amt (wt %) | | | | | |
|---|---|---|---|---|---|---|---|
| Type | Identity | 1 | 2 | 3 | 4 | 5 | 6 |
| (Meth)acrylate | PEGMA | 77.1 | 76.6 | 76.6 | 76.6 | 76.6 | 76.6 |
| Plasticizer | FLEXOL | 20.0 | 20.0 | 20.0 | 20.0 | 20.0 | 20.0 |
| Enamine Cure | H | 0 | 0 | 0.5 | 0 | 0 | 0 |

TABLE 1-continued

| Type | Identity | 1 | 2 | 3 | 4 | 5 | 6 |
|---|---|---|---|---|---|---|---|
| Accelerator | I | 0 | 0 | 0 | 0.5 | 0 | 0 |
|  | C | 0 | 0 | 0 | 0 | 0.5 | 0 |
|  | F | 0 | 0 | 0 | 0 | 0 | 0.5 |
| Phenylene Diamine Cure Accelerator | SANTOFLEX 77PD* | 0 | 0.5 | 0 | 0 | 0 | 0 |
| Anaerobic Cure Inducing Composition | CHP | 1.3 | 1.3 | 1.3 | 1.3 | 1.3 | 1.3 |
|  | Saccharin | 1.0 | 1.0 | 1.0 | 1.0 | 1.0 | 1.0 |
|  | Naphthaquinone** | 0.1 | 0.1 | 0.1 | 0.1 | 0.1 | 0.1 |
|  | Chelator | 0.5 | 0.5 | 0.5 | 0.5 | 0.5 | 0.5 |

N,N'-bis(1,4-dimethylpentyl)-p-phenylene diamine (CAS No. 3081-14-9), and as shown below

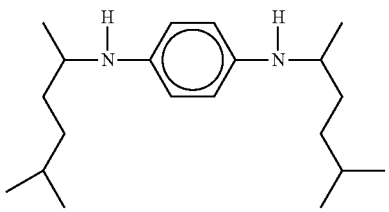

solution in PEGMA.

Initially, the compositions were prepared by adding with mechanical mixing at room temperature the appropriate amounts of the components as noted.

The components were mixed for an appropriate period of time to allow for dissolution and/or dispersion, as the case may be, of the solid components. The so-formed formulations were stored for further use by covering the beaker ensuring that an air pocket remained between the surface of the formulation and the cover.

The formulations in accordance with this invention show shelf-stability at room temperature in open containers over time.

Application and Ambient Temperature
Cure of Anaerobic Adhesives

Figure 2:
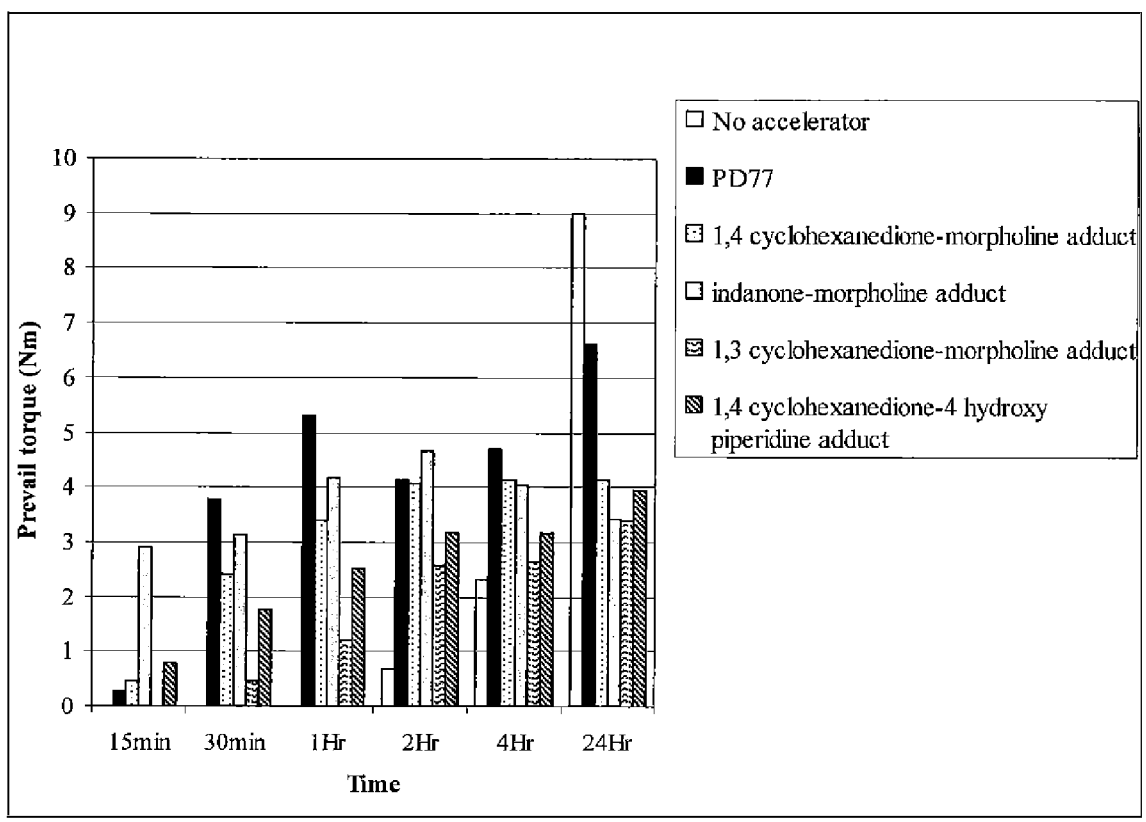
FIG. 2 depicts prevail against cure time for inventive anaerobic adhesive compositions and control anaerobic adhesive compositions.

The sample formulations prepared as described above were applied in duplicate to five sets of degreased M10×1.5 (major diameter: 9.96-9.73; minor diameter: 8.08-7.98; pitch circle diameter: 8.99-8.86) mild steel nut and bolt assemblies, which were then allowed to cure at room temperature for a period of time of about 0.25, 0.5, 1, 2, 4 and 24 hours. After the cure time, the fasteners were evaluated for break strength and prevail strength, data for which are shown below in Table 2 and FIGS. 1 and 2 (without taking into account standard deviations, which are shown in FIG. 1).

TABLE 2

Break/Prevail (N-m) on Degreased Steel Nuts/Bolts

| Room Temp. Cure (hrs) | Sample No. | | | | | |
|---|---|---|---|---|---|---|
|  | 1 | 2 | 3 | 4 | 5 | 6 |
| 0.25 | 0/0 | 0.8/0.3 | 2.3/0.5 | 5.8/2.9 | 0/0 | 2.3/0.8 |
| 0.5 | 0/0 | 6.5/3.8 | 6.0/2.4 | 7.7/3.1 | 1.6/0.5 | 5.0/1.8 |
| 1 | 0/0 | 8.0/5.3 | 7.9/3.4 | 8.3/4.2 | 5.8/1.2 | 7.0/2.5 |
| 2 | 1.7/0.7 | 8.7/4.2 | 9.2/4.1 | 8.8/4.6 | 8.3/2.6 | 8.2/3.2 |
| 4 | 6.9/2.3 | 9.4/4.7 | 8.6/4.1 | 8.1/4.0 | 10.1/2.6 | 8.8/3.2 |
| 24 | 14.9/9.0 | 10.3/6.6 | 8.5/4.1 | 8.9/3.4 | 12.1/3.4 | 11.2/3.9 |

These data indicate that the compositions in accordance with this invention (Sample Nos. 3-6) functioned at room temperature like traditional anaerobic (meth)acrylate-based adhesives when applied and cured on the substrates. Indeed, compared with Sample No. 1 which has no added accelerator and even in comparion with Sample No. 2, made in accordance with U.S. Pat. No. 6,723,763 (Zhu), the inventive compositions showed enhanced cure speed.

What is claimed is:

1. An anaerobic adhesive composition, comprising:
   (a) a (meth)acrylate component; and
   (b) an anaerobic cure system comprising a compound having at least one enamine unit.

2. The composition according to claim 1, wherein the compound having at least one enamine unit is formed from a carbocyclic ring having at least 5 ring atoms.

3. The composition according to claim 1, wherein the (meth)acrylate component is represented by $H_2C=CGCO_2R^3$, wherein G is a member selected from the group consisting of H, halogen and alkyl having from 1 to about four carbon atoms, and $R_1$ is a member selected from the group consisting of alkyl group having from 1 to about 16 carbon atoms, cycloalkyl, alkenyl, cylcoalkenyl, alkaryl, and aryl groups, with or without substitution or interruption by a member selected from the group consisting of silane, silicon, oxygen, halogen, carbonyl, hydroxyl, ester, carboxylic acid, urea, urethane, carbamate, amine, amide, sulfur, sulonate and sulfone.

4. The composition according to claim 1, wherein the (meth)acrylate component is a member selected from the group consisting of silicone (meth)acrylate moieties, polyethylene glycol di(meth)acrylates, bisphenol-A-(meth)acrylates, ethoxylated bisphenol-A-(meth)acrylates, tetrahydrofuran (meth)acrylates and di(meth)acrylates, hydroxypropyl (meth)acrylate, hexanediol di(meth)acrylate, trimethylol propane tri(meth)acrylate, and an acrylate ester corresponding to the structure shown below:

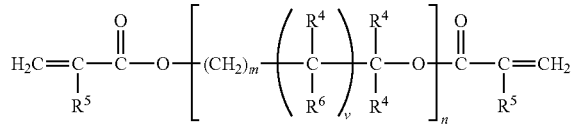

wherein $R^4$ may be selected from the group consisting of hydrogen, alkyl of 1 to about 4 carbon atoms, hydroxyalkyl of 1 to about 4 carbon atoms and

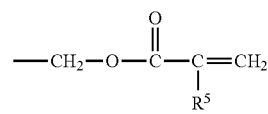

$R^5$ may be selected from the group consisting of hydrogen, halogen, and alkyl of 1 to about 4 carbon atoms;

$R^6$ may be selected from the group consisting of hydrogen, hydroxy

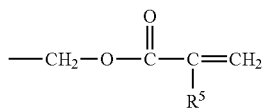

m is at least 1;
v is 0 or 1; and
n is at least 1;
and combinations thereof.

5. The composition according to claim 1, wherein the compound having at least one enamine unit is embraced by

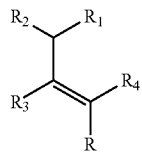

wherein R, $R^1$ and $R^2$ are each independently selected from alkyl, alkenyl, cycloalkenyl and aryl and substituted versions thereof, or taken together form a saturated or unsaturated ring with or without interuption by a heteroatom and with or without substitution;
  at least one of $R^3$ and $R^4$ (is)are each independently selected from —C(=X)—$R^5$ or Ar, wherein $R^5$ is alkyl, cycloalkyl, alkenyl, cycloalkenyl and aryl and substituted versions thereof and Ar is an aromatic ring; and X is O, S, $NR^6$, $CR^7R^8$, or $CR^7NR^1R^2$, wherein $R^6$, $R^7$ or $R^8$ are each independently selected from alkyl, cycloalkyl, alkenyl, cycloalkenyl and aryl and substituted versions thereof, and $R^1$ and $R^2$ are each independently as defined above.

6. The composition according to claim 2, wherein the carbocyclic ring is substituted by one or more halogen atoms, hydroxyl groups, alkyl groups, alkenyl groups, aryl groups, carboxyl groups, or amino groups.

7. The composition according to claim 1, further comprising one or more members selected from the group consisting of saccharin, peroxides, chelators, metals, hydrazines and toluidines.

8. Reaction products of the composition according to claim 1.

9. An anaerobic cure system comprising a compound having at least one enamine unit and one or more members selected from the group consisting of saccharin, peroxides, chelators, metals, hydrazines and toluidines.

10. The anaerobic cure system according to claim 9, the compound having at least one enamine unit is embraced by

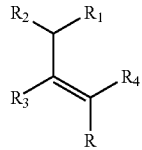

wherein R, $R^1$ and $R^2$ are each independently selected from alkyl, alkenyl, cycloalkenyl and aryl and substituted versions thereof, or taken together form a saturated or unsaturated ring with or without interuption by a heteroatom and with or without substitution;
  $R^3$ and $R^4$ are each independently selected from —C(=X)—$R^5$ or Ar, wherein $R^5$ is alkyl, alkenyl, cycloalkenyl and aryl and substituted versions thereof and Ar is an aromatic ring; and
  X is O, S, $NR^6$, $CR^7R^8$, or $CR^7NR^1R^2$, wherein $R^6$, $R^7$ or $R^8$ are each independently selected from alkyl, alkenyl, cycloalkenyl and aryl and substituted versions thereof, and $R^1$ and $R^2$ are each independently as defined above.

11. The composition according to claim 1, wherein the compound is selected from one or more of A
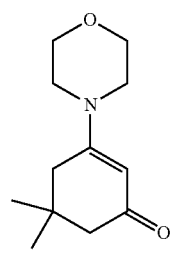

B
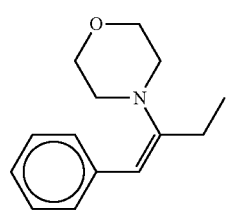

C
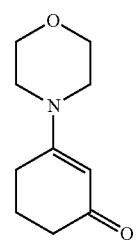

D
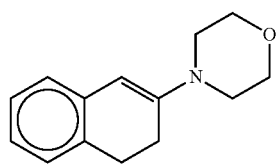

1, 3 cyclohexanedione-morpholine adduct

E

F
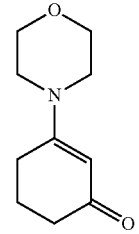

1, 4 cyclohexanedione 4 hydroxy piperidine-adduct

-continued
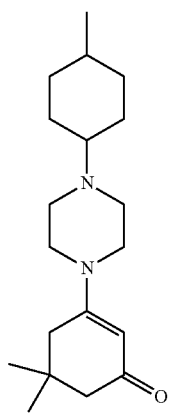
1, 4 cyclohexanedione-morpholine adduct
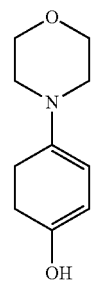
Indanone-mopholine adduct
12. The anaerobic cure system according to claim 9, wherein the compound having at least one enamine unit is
A
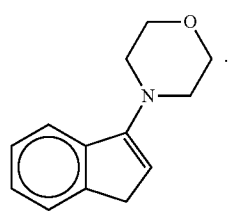
B
-continued
C
D
1, 3 cyclohexanedione-morpholine adduct
E
F
1, 4 cyclohexanedione 4 hydroxy piperidine-adduct
G
H
1, 4 cyclohexanedione-morpholine adduct

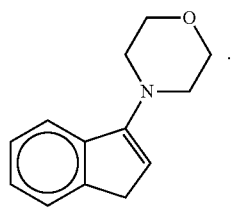

Indanone-mopholine adduct

13. A method of using one or more compounds having at least one enamine unit as a component of an anaerobic cure system for anaerobic adhesive, said method comprising the steps of
providing one or more compounds having at least one enamine unit; and
providing one or more members selected from the group consisting of saccharin, peroxides, chelators, metals, hydrazines and toluidines.

14. A method of preparing an anaerobic adhesive composition, comprising the step of:
mixing together a (meth)acrylate component and an anaerobic cure system comprising compounds having at least one enamine unit.

* * * * *